United States Patent Office 3,113,067
Patented Dec. 3, 1963

3,113,067
ALKANOLAMINE SALTS OF SALICYL ANILIDES AND PROCESS FOR THEIR PRODUCTION
Reimer Strufe, Ernst Schraufstätter, and Rudolf Gönnert, all of Wuppertal-Elberfeld, Germany, assignors to Farbenfabriken Bayer Aktiengesellschaft, Leverkusen, Germany, a corporation of Germany
No Drawing. Filed Aug. 23, 1960, Ser. No. 51,286
Claims priority, application Germany Aug. 27, 1959
10 Claims. (Cl. 167—30)

The present invention relates to and has as its objects new and useful pesticidal compounds especially for combating snails and slugs and methods for their preparation. Generally the new compounds of this invention are alkanolamine salts of salicyl anilides of the general formula

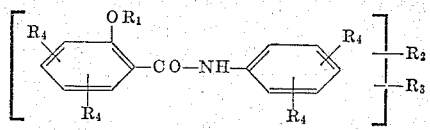

wherein $R_1$ denotes hydrogen or an aliphatic acyl radical, $R_2$ and $R_3$ denote a nitro group, chlorine or bromine whereby at least $R_2$ or $R_3$ mean a halogen atom, $R_4$ denotes hydrogen or halogen or alkyl or alkoxy groups with 1–5 carbon atoms or nitro groups whereby at least one of $R_4$ denotes a nitro group.

The free salicyl anilides and their gastropod combatting properties are the subject matter of copending U.S. patent application Serial No. 612,104, filed September 26, 1956, now abandoned; Serial No. 847,679, filed October 21, 1959, now abandoned; Serial No. 847,680, filed October 21, 1959; and Serial No. 32,602, filed May 31, 1960, now issued to Patent 3,079,297.

In accordance with the present invention such compounds can be obtained in a manner known in principle i.e. by reacting salicyl anilides of the above formula with one or more alkanolamines.

As it is stated above it is known to use substituted 2-hydroxybenzanilides and their O-acyl compounds as gastropod combating agents; however, these compounds are barely water-soluble and have therefore several disadvantages in practice.

It is also known to use there substituted 2-hydroxybenzanilides in the form of their alkali metal salts. However, the majority of these alkali metals salts have the disadvantage of being rapidly re-precipitated in the practically important mineral salt-containing waters and are therefore likewise not very suitable for combating snails living in water.

By reacting salicyl anilides of the above mentioned general formula with organic bases of the alkanolamine series, salts which are not precipitated in an aqueous mineral-salt-containing solution which are stable even without addition of emulsifiers, are produced.

The production of the aforesaid alkanolamine salts is carried out according to known methods by reacting the salicyl anilides with alkanolamines such as mono-ethanolamine, N-methyl-ethanol-amine or 1,2-dimethyl-ethanolamine and the like.

The reaction of liquid alkanolamines with nitro-salicyl anilides can be carried out chiefly at an elevated temperature and without a solvent. The reaction may be effected, if desired, with an addition of water or in the presence of an organic solvent. Low molecular weight aliphatic alcohols or chlorinated low molecular weight hydrocarbons may be used, for example, with good results as solvents.

The use of an aqueous or organic solvent has proved to be particularly suitable for the reaction of nitrosalicylanilides with alkanolamines which are present in the solid form such as 1,2-dimethylethanolamine.

However, the reaction may also be carried out with the use of an organic solvent in which the salt formed remains completely dissolved after the reaction is terminated. Such a solution prepared with the use of one or several solvents such as dimethylformamide and/or dimethyl-sulfoxide may be used directly and without further formulation for combating water snails, since it is readily water-miscible.

The following examples are given for the purpose of illustrating the present invention.

*Example 1*

25 grams of 5,2'-dichloro-4'-nitrosalicylanilide are suspended in 150 ml. of methanol and treated at 55° C. while stirring with a solution of 10 grams of diethanolamine in 50 ml. of methanol. The resulting brown solution solidifies upon cooling to give a pale yellow homogeneous mass which is filtered off with suction, washed with a little cold water and dried in a vacuum. Yield: 28 grams, melting point 186° C.

*Example 2*

4.5 grams of 5,2',5'-trichloro-4'-nitrosalicylanilide are suspended in 40 ml. of water and treated while stirring with a solution of 1.5 grams of 1,2-dimethyl-ethanolamine in 10 ml. of water, stirring being continued at room temperature. The separated yellow salt is filtered off with suction, washed with a little cold water and dried in a vacuum. Yield: 5.2 grams, melting at 201° C.

*Example 3*

50 grams of 5,2'-dichloro-4'-nitrosalicylanilide are mixed in a kneading machine with 11 grams of ethanolamine. A yellow-brown salt melting at 204° C. is formed with evolution of heat.

*Example 4*

Into a mixture of 200 grams of dimethylsulfoxide and 40 grams of monoethanolamine there are introduced while stirring 50 grams of finely powdered 5,2'-dichloro-4'-nitrosalicylanilide. This solution dissolves in water with a yellow color.

*Example 5*

4.3 grams of 5-bromo-2',5'-dichloro-4'-nitrosalicylanilide are suspended in 40 ml. of cold water and treated with mechanical stirring at room temperature with a solution of 1.2 grams of 3-hydroxy-propylamine-(1) in 10 ml. of water. The initially pale yellow suspension becomes intensely yellow and solidifies to form a slurry-like mass which is filtered off with suction, washed with a little water and dried at 40° C. in a vacuum. Yield: 5.2 grams, melting point 209° C.

*Example 6*

From 1.9 grams of 3-methyl-5,3',5'-trichloro-4'-nitrosalicylanilide suspended in 25 ml. of water and 0.9 gram of 3-hydroxypropylamine-(1) dissolved in 5 ml. of water there are formed under the conditions described in Example 5 2.3 grams of a salt melting at 189° C.

*Example 7*

To a suspension of 3.3 grams of 5,2',5'-trichloro-4'-nitroacetylsalicylanilide in 10 ml. of ethylene dichloride a solution of 0.8 gram of N-methyl-ethanolamine in 2 ml. of ethylene dichloride is added dropwise while stirring at room temperature and stirring is continued for a further 10 minutes. The precipitating slurry-like mass is filtered off with suction and, after washing with a little ethylene dichloride, dried at 50° C. in a vacuum. Yield: 3.7 grams, melting point 149° C.

*Example 8*

1.25 grams of 5,3',5'-trichloro-2'-nitrosalicylanilide suspended in 15 ml. of ethylene dichloride are treated under the conditions described in Example 7 with 0.6 gram of N-methyl-ethanolamine dissolved in 5 ml. of ethylene dichloride. Yield: 1.6 grams, melting point 178° C.

*Example 9*

2.0 grams of 3-methyl-5,2',5'-trichloro-4'-nitroacetylsalicylanilide are suspended in 40 ml. of carbon tetrachloride and mixed at 50° C. while stirring with a solution of 1.8 grams of 3-aminobutanol-(1) in 10 ml. of carbon tetrachloride, stirring being continued for a further 15 minutes. The product is filtered off with suction, washed with a little cold carbon tetrachloride on the suction filter and dried at 40° C. in a vacuum. Yield: 2.6 grams, melting point 160° C.

Other salicylanilides which can be reacted with suitable alkanolamines to give useful compounds in the meaning of this invention are the following. This list, however, is not intended to reduce the scope of this invention in any way:

5-chloro-4'-nitrosalicylanilide (M.P. 260° C.)
5-nitro-4'-chlorosalicylanilide (M.P. 252° C.)
5,3',5'-trichloro-2'-nitrosalicylanilide (M.P. 190° C.)
5,5'-dichloro-2'-methyl-4'-nitrosalicylanilide (M.P. 235° C.)
5,3'-dichloro-4'-nitrosalicylanilide (M.P. 241° C.)
5,2',5'-trichloro-3,4-dinitrosalicylanilide (M.P. 199° C.)
5,2',3',6'-tetrachloro-4'-nitrosalicylanilide (M.P. 195° C.)
5,4',6'-trichloro-2'-nitrosalicylanilide (M.P. 204° C.)
5,2',5'-trichloro-4'-nitro-2-acetoxybenzanilide (M.P. 169° C.)
5,4'-dichloro-3'-nitro-2-acetoxybenzanilide (M.P. 172° C.)
5,2',5'-trichloro-3-methyl-4'-nitro-2-acetoxybenzanilide (M.P. 165° C.)
5,2',6'-trichloro-4'-nitrosalicylanilide (M.P. 230° C.)
3,5,2',5'-tetrachloro-4'-nitrosalicylanilide (M.P. 226° C.)
5,4'-dichloro-2-nitrosalicylanilide (M.P. 175° C.)

We claim:

1. A lower alkanolamine salt of a salicylanilide of the following formula

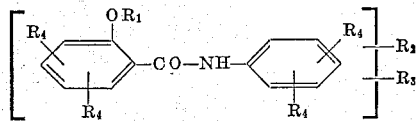

wherein $R_1$ represents a member selected from the group consisting of hydrogen and lower alkanoyl radicals; $R_2$ and $R_3$ are nucleus substituents and each represent a member selected from the group consisting of chlorine, bromine, iodine and the nitro group, with the provision that at least one of the aforementioned halogen atoms is always present; $R_4$ represents a member selected from the group consisting of hydrogen, chlorine, bromine, iodine, lower alkyl groups having 1–5 carbon atoms, lower alkoxy groups having 1–5 carbon atoms and the nitro group, with the provision that at least one nitro group is always present.

2. The method of combating gastropods which comprises applying to at least one of the gastropods and their habitat an alkanolamine salt of a compound having the formula

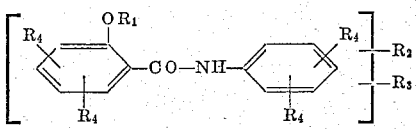

wherein $R_1$ represents a member selected from the group of hydrogen and lower alkanoyl radicals; $R_2$ and $R_3$ are nucleus substituents and each represent a member selected from the group consisting of chlorine, bromine, iodine and the nitro group, with the provision that at least one of the aforementioned halogen atoms is always present; $R_4$ represents a member selected from the group consisting of hydrogen, chlorine, bromine, iodine, lower alkyl groups having 1–5 carbon atoms, lower alkoxy groups having 1–5 carbon atoms and the nitro group, with the provision that at least one nitro group is always present.

3. The diethanolamine salt of 5,2'-dichloro-4'-nitrosalicylanilide.

4. The 1,2-dimethylethanolamine salt of 5,2',5'-trichloro-4'-nitrosalicylanilide.

5. The monoethanolamine salt of 5,2'-dichloro-4'-nitrosalicylanilide.

6. The 3-hydroxy-propylamine-(1) salt of 5-bromo-2',5'dichloro-4'-nitrosalicylanilide.

7. The 3-hydroxypropylamine-(1) salt of 3-methyl-5,3',5'-trichloro-4'-nitrosalicylanilide.

8. The N-methylethanolamine salt of 5,2',5'-trichloro-4'-nitroacetylsalicylanilide.

9. The N-methylethanolamine salt of 5,3',5'-trichloro-2'-nitrosalicylanilide.

10. The 3-aminobutanol-(1) salt of 3-methyl-5,2',5'-trichloro-4'-nitroacetylsalicylanilide.

References Cited in the file of this patent

UNITED STATES PATENTS

| | | |
|---|---|---|
| 2,328,505 | Smith et al. | Aug. 31, 1943 |
| 2,702,302 | Cook et al. | Feb. 15, 1955 |
| 2,703,332 | Bindler et al. | Mar. 1, 1955 |
| 2,731,386 | Reiner | Jan. 17, 1956 |
| 2,745,781 | Stewart | May 15, 1956 |

FOREIGN PATENTS

| | | |
|---|---|---|
| 429,270 | Great Britain | May 22, 1935 |